(12) United States Patent
Vetro et al.

(10) Patent No.: US 6,650,705 B1
(45) Date of Patent: Nov. 18, 2003

(54) METHOD FOR ENCODING AND TRANSCODING MULTIPLE VIDEO OBJECTS WITH VARIABLE TEMPORAL RESOLUTION

(75) Inventors: Anthony Vetro, Staten Island, NY (US); Huifang Sun, Cranbury, NJ (US)

(73) Assignee: Mitsubishi Electric Research Laboratories Inc., Cambridge, MA (US)

( * ) Notice: Subject to any disclaimer, the term of this patent is extended or adjusted under 35 U.S.C. 154(b) by 0 days.

(21) Appl. No.: 09/579,889

(22) Filed: May 26, 2000

(51) Int. Cl.[7] .................................................. H04N 7/18
(52) U.S. Cl. ............................. 375/240.08; 375/240.09
(58) Field of Search ........................ 375/240.01–240.29

(56) References Cited

U.S. PATENT DOCUMENTS

| | | | |
|---|---|---|---|
| 5,847,761 A | | 12/1998 | Uz et al. ..................... 348/404 |
| 5,969,764 A | | 10/1999 | Sun et al. ..................... 348/404 |
| 6,026,195 A | * | 2/2000 | Eifrig et al. ................. 382/236 |
| 6,167,084 A | * | 12/2000 | Wang et al. ............. 375/240.02 |
| 6,192,080 B1 | * | 2/2001 | Sun et al. ............... 375/240.16 |
| 6,295,371 B1 | * | 9/2001 | Rucklidge et al. .......... 382/176 |
| 6,385,242 B1 | * | 5/2002 | Chen ..................... 375/240.03 |
| 6,411,724 B1 | * | 6/2002 | Vaithilingam et al. ....... 382/100 |
| 6,459,812 B2 | * | 10/2002 | Suzuki et al. ............... 382/232 |

* cited by examiner

Primary Examiner—Andy Rao
(74) Attorney, Agent, or Firm—Dirk Brinkman; Andrew Curtin

(57) ABSTRACT

A video is first partitioned into video objects. If the video is uncompressed, then the partitioning is done with segmentation planes. In the case where the video is compressed, a demultiplexer is used for the partitioning. Over time, shape features are extracted from each partitioned object. The extracted shape features are combined to determined a temporal resolution for each object over time. The temporal resolutions are subsequently used to encode or transcode the video objects as an output compressed video.

19 Claims, 8 Drawing Sheets

METHOD FOR ENCODING AND TRANSCODING MULTIPLE VIDEO OBJECTS WITH VARIABLE TEMPORAL RESOLUTION

FIELD OF THE INVENTION

This invention relates generally to encoding and transcoding multiple video objects, and more particularly to a system that controls the encoding and transcoding of multiple video objects with variable temporal resolutions.

BACKGROUND OF THE INVENTION

Recently, a number of standards have been developed for communicating encoded information. For video sequences, the most widely used standards include MPEG-1 (for storage and retrieval of moving pictures), MPEG-2 (for digital television) and H.263, see ISO/IEC JTC1 CD 11172, MPEG, "Information Technology—Coding of Moving Pictures and Associated Audio for Digital Storage Media up to about 1.5 Mbit/s—Part 2: Coding of Moving Pictures Information," 1991, LeGall, "MPEG: A Video Compression Standard for Multimedia Applications," Communications of the ACM, Vol. 34, No. 4, pp. 46–58, 1991, ISO/IEC DIS 13818-2, MPEG-2, "Information Technology—Generic Coding of Moving Pictures and Associated Audio Information—Part 2: Video," 1994, ITU-T SG XV, DRAFT H.263, "Video Coding for Low Bitrate Communication," 1996, ITU-T SG XVI, DRAFT13 H.263+Q15-A-60 rev.0, "Video Coding for Low Bitrate Communication," 1997.

These standards are relatively low-level specifications that primarily deal with the spatial and temporal compression of video sequences. As a common feature, these standards perform compression on a per frame basis. With these standards, one can achieve high compression ratios for a wide range of applications.

Newer video coding standards, such as MPEG-4 (for multimedia applications), see"Information Technology—Generic coding of audio/visual objects," ISO/IEC FDIS 14496-2 (MPEG4 Visual), Nov. 1998, allow arbitrary-shaped objects to be encoded and decoded as separate video object planes (VOP). The objects can be visual, audio, natural, synthetic, primitive, compound, or combinations thereof. Video objects are composed to form compound objects or "scenes."

The emerging MPEG-4 standard is intended to enable multimedia applications, such as interactive video, where natural and synthetic materials are integrated, and where access is universal. MPEG-4 allows for content based interactivity. For example, one might want to "cut-and-paste" a moving figure or object from one video to another. In this type of application, it is assumed that the objects in the multimedia content have been identified through some type of segmentation process, see for example, U.S. patent application Ser. No. 09/326,750 "Method for Ordering Image Spaces to Search for Object Surfaces" filed on Jun. 4, 1999 by Lin et al.

In the context of video transmission, these compression standards are needed to reduce the amount of bandwidth (available bit rate) that is required by the network. The network can represent a wireless channel or the Internet. In any case, the network has limited capacity and a contention for its resources must be resolved when the content needs to be transmitted.

Over the years, a great deal of effort has been placed on architectures and processes that enable devices to transmit the video content robustly and to adapt the quality of the content to the available network resources. Rate control is used to allocate the number of bits per coding time instant. Rate control ensures that the bitstream produced by an encoder satisfies buffer constraints.

Rate control processes attempt to maximize the quality of the encoded signal, while providing a constant bit rate. For frame-based encoding, such as MPEG-2, see U.S. Pat. No. 5,847,761, "Method for performing rate control in a video encoder which provides a bit budget for each frame while employing virtual buffers and virtual buffer verifiers," issued to Uz, et al. on Dec. 8, 1998. For object-based encoding, such as MPEG-4, see U.S. Pat. No. 5,969,764, "Adaptive video coding method," issued to Sun and Vetro on Oct. 19, 1999.

When the content has already been encoded, it is sometimes necessary to further convert the already compressed bitstream before the stream is transmitted through the network to accommodate, for example, a reduction in the available bit rate. Bit stream conversion or"transcoding" can be classified as bit rate conversion, resolution conversion, and syntax conversion. Bit rate conversion includes bit rate scaling and conversion between a constant bit rate (CBR) and a variable bit rate (VBR). The basic function of bit rate scaling is to accept an input bitstream and produce a scaled output bitstream that meets new load constraints of a receiver. A bit stream scaler is a transcoder, or filter, that provides a match between a source bitstream and the receiving load.

As shown in FIG. 1, typically, scaling can be accomplished by a transcoder 100. In a brute force case, the transcoder includes a decoder 110 and encoder 120. A compressed input bitstream 101 is fully decoded at an input rate Rin, then encoded at a new output rate Rout 102 to produce the output bitstream 103. Usually, the output rate is lower than the input rate. However, in practice, full decoding and full encoding in a transcoder is not done due to the high complexity of encoding the decoded bitstream, instead the transcoding is done on a compressed or partial decoded bitstream.

Earlier work on MPEG-2 transcoding has been published by Sun et al., in "Architectures for MPEG compressed bitstream scaling," IEEE Transactions on Circuits and Systems for Video Technology, April 1996. There, four methods of rate reduction, with varying complexity and architecture, were presented.

FIG. 2 shows an example method. In this architecture, the video bitstream is only partially decoded. More specifically, macroblocks of the input bitstream 201 are variable-length decoded (VLD) 210. The input bitstream is also delayed 220 and inverse quantized (IQ) 230 to yield discrete cosine transform (DCT) coefficients. Given the desired output bit rate, the partially decoded data are analyzed 240 and a new set of quantizers is applied at 250 to the DCT macroblocks. These re-quantized macroblocks are then variable-length coded (VLC) 260 and a new output bitstream 203 at a lower rate can be formed. This scheme is much simpler than the scheme shown in FIG. 1 because the motion vectors are re-used and an inverse DCT operation is not needed.

More recent work by Assuncao et al., in "A frequency domain video transcoder for dynamic bit-rate reduction of MPEG-2 bitstreams," IEEE Transactions on Circuits and Systems for Video Technology, pp. 953–957, December 1998, describe a simplified architecture for the same task. They use a motion compensation (MC) loop, operating in the frequency domain for drift compensation. Approximate matrices are derived for fast computation of the MC macroblocks in the frequency domain. A Lagrangian optimization is used to calculate the best quantizer scales for transcoding.

Other work by Sorial et al, "Joint transcoding of multiple MPEG video bitstreams," Proceedings of the International Symposium on Circuits and Systems, May 1999, presents a method of jointly transcoding multiple MPEG-2 bitstreams, see also U.S. patent application Ser. No. 09/410,552 "Estimating Rate-Distortion Characteristics of Binary Shape Data," filed Oct. 1, 1999 by Vetro et al.

According to prior art compression standards, the number of bits allocated for encoding texture information is controlled by a quantization parameter (QP). The above papers are similar. Changing the QP on the basis of information contained in the original bitstream reduces the rate of texture bits. For an efficient implementation, the information is usually extracted directly in the compressed domain and can include measures that relate to the motion of macroblocks or residual energy of DCT macroblocks. This type of analysis can be found in the bit allocation analyzer 240 of FIG. 2.

In addition to the above classical methods of transcoding, some new methods of transcoding have been described, for example, see U.S. patent application Ser. No. 09/504,323 "Object-Based Bitstream Transcoder," filed by Vetro et al. on Feb. 14, 2000, for example. There, information delivery systems that overcome limitations of conventional transcoding systems were described. The conventional systems were somewhat bounded in the amount of rate that could be reduced, and also the conventional systems did not consider the overall perceptual quality; rather, objective measures, such as PSNR have dominated.

In the systems described by Vetro, et al., conversion is more flexible and the measure of quality can deviate from classical bit-by-bit differences.

Vetro summarizes video content in very unique ways. Within the object-based framework, individual video objects are transcoded with different qualities. The difference in quality can be related to either the spatial quality or the temporal resolution (quality).

If the temporal resolution is varied among objects in a scene, it is important that all objects maintain some type of temporal synchronization with each other. When temporal synchronization is maintained, the receiver can compose the objects so that all pixels within a reconstructed scene are defined.

Undefined pixels in the scene can result from background and foreground objects, or overlapping objects being sampled at different temporal resolutions so that in the re-composed scene, "holes" appear. Therefore, when varying the temporal resolution of multiple objects during encoding or transcoding, it was critical that synchronization was maintained.

To illustrate this point further. Consider a scene where there is a relatively stationary background object, e.g., a blank wall, and a more active foreground object such as moving person. The background can be encoded at a relatively low temporal resolution; say ten frames per second. The foreground object is encoded at a higher temporal resolution of thirty frames per second. This is fine as long as the foreground object does not move a lot. However, should the foreground object move with respect o the background, a "hole" will appear in that portion of the background, which is no longer occluded by the foreground object.

It is an object of the invention to correct this problem and to enable encoding and transcoding of multiple video objects with variable temporal resolutions.

The most recent standardization effort taken on by the MPEG standard committee is that of MPEG-7, formally called "Multimedia Content Description Interface," see "MPEG-7 Context, Objectives and Technical Roadmap," ISO/IEC N2861, July 1999. Essentially, this standard plans to incorporate a set of descriptors and description schemes that can be used to describe various types of multimedia content. The descriptor and description schemes are associated with the content itself and allow for fast and efficient searching of material that is of interest to a particular user. It is important to note that this standard is not meant to replace previous coding standards, rather, it builds on other standard representations, especially MPEG-4, because the multimedia content can be decomposed into different objects and each object can be assigned a unique set of descriptors. Also, the standard is independent of the format in which the content is stored.

The primary application of MPEG-7 is expected to be search and retrieval applications, see "MPEG-7 Applications," ISO/IEC N2861, July 1999. In a simple application, a user specifies some attributes of a particular object. At this low-level of representation, these attributes can include descriptors that describe the texture, motion and shape of the particular object. A method of representing and comparing shapes has been described in U.S. patent application Ser. No. 09/326,759 "Method for Ordering Image Spaces to Represent Object Shapes" filed on Jun. 4, 1999 by Lin et al., and a method for describing the motion activity has been described in U.S. patent application Ser. No. 09/406,444 "Activity Descriptor for Video Sequences" filed on Sep. 27, 1999 by Divakaran et al. To obtain a higher-level of representation, one can consider more elaborate description schemes that combine several low-level descriptors. In fact, these description schemes can even contain other description schemes, see "MPEG-7 Multimedia Description Schemes WD (V1.0)," ISO/IEC N3113, December 1999 and U.S. patent application Ser. No. 09/385,169 "Method for representing and comparing multimedia content," filed Aug. 30, 1999 by Lin et al.

These descriptors and description schemes allow a user to access properties of the video content that are not traditionally derived by an encoder or transcoder. For example, these properties can represent look-ahead information that was assumed to be inaccessible to the transcoder. The only reason that the encoder or transcoder has access to these properties is because the properties were extracted from the content at an earlier time, i.e., the content was pre-processed and stored in a database with its associated meta-data.

The information itself can be either syntactic or semantic, where syntactic information refers to the physical and logical signal aspects of the content, while the semantic information refers to the conceptual meaning of the content. For a video sequence, the syntactic elements can be related to the color, shape and motion of a particular object. On the other hand, the semantic elements can refer to information that cannot be extracted from low-level descriptors, such as the time and place of an event or the name of a person in a video sequence.

It is desired to maintain synchronization in an object-based encoder or transcoder for video objects in a scene having variable temporal resolutions. Moreover, it is desired that such variation is identified with video content meta-data.

SUMMARY OF THE INVENTION

The present invention provides an apparatus and method for coding a video. The coding according to the invention can be performed by an encoder or a transcoder. The video is first partitioned into video objects. In the case of the encoder, the partitioning is done with segmentation planes, and in the case of the transcoder, a demultiplexer is used. Over time, shape features are extracted from each object. The shape features can be obtained by measuring how the shape of each object evolves over time. A Hamming or Hausdorff distance measure can be used. The extracted shape features are combined in a rate or transcoder control unit to determine a temporal resolution for each object over time. The temporal resolutions are used to encode the various video objects. Optionally, motion features and coding complexity can also be considered while making trade-offs in temporal resolution determinations.

In the case where the video is uncompressed data, the partitioning, combining, and coding is performed in an encoder. For a compressed video, the demultiplxing, combining, and coding are performed in a transcoder. In the later case, boundary blocks of the objects in the compressed-video are used for extracting the shape features. In one aspect of the invention, different objects can have different temporal resolutions or frame rates.

DETAILED DESCRIPTION OF PREFERRED EMBODIMENTS

Introduction to Variable Temporal Resolution Encoding and Transcoding

Our invention provides a method and apparatus for controlling temporal resolutions while encoding and transcoding multiple video objects in a scene. The temporal resolution controller enables the encoding, transcoding, and reconstruction of objects having variable and different temporal resolutions. One of the main advantages of an object-based coding scheme is that both the spatial and temporal resolution of the objects can vary independently.

Providing higher spatial quality to more interesting objects, such as human faces, is desired; the same is true for temporal resolution. However, in the context of temporal resolution, a major subtlety exists. That is, synchronization among the objects in the scene must be maintained so that all of the pixels in the reconstructed scene are defined. It should be noted that video reconstruction of a compressed video are defined by the normative part of most video standards, (MPEG-1/2/4), and handled by conventional decoders. Therefore, decoders are not described herein.

The method and apparatus we describe are applicable to both object-based encoding and transcoding systems, and real-time as well as non real-time applications. During encoding, the input video is uncompressed, and during the transcoding, the input video is compressed. In both cases, the output video is compressed. The mechanism and procedures that we describe can be seamlessly integrated into the architecture of prior art devices.

Composition Problem

Figure 1:
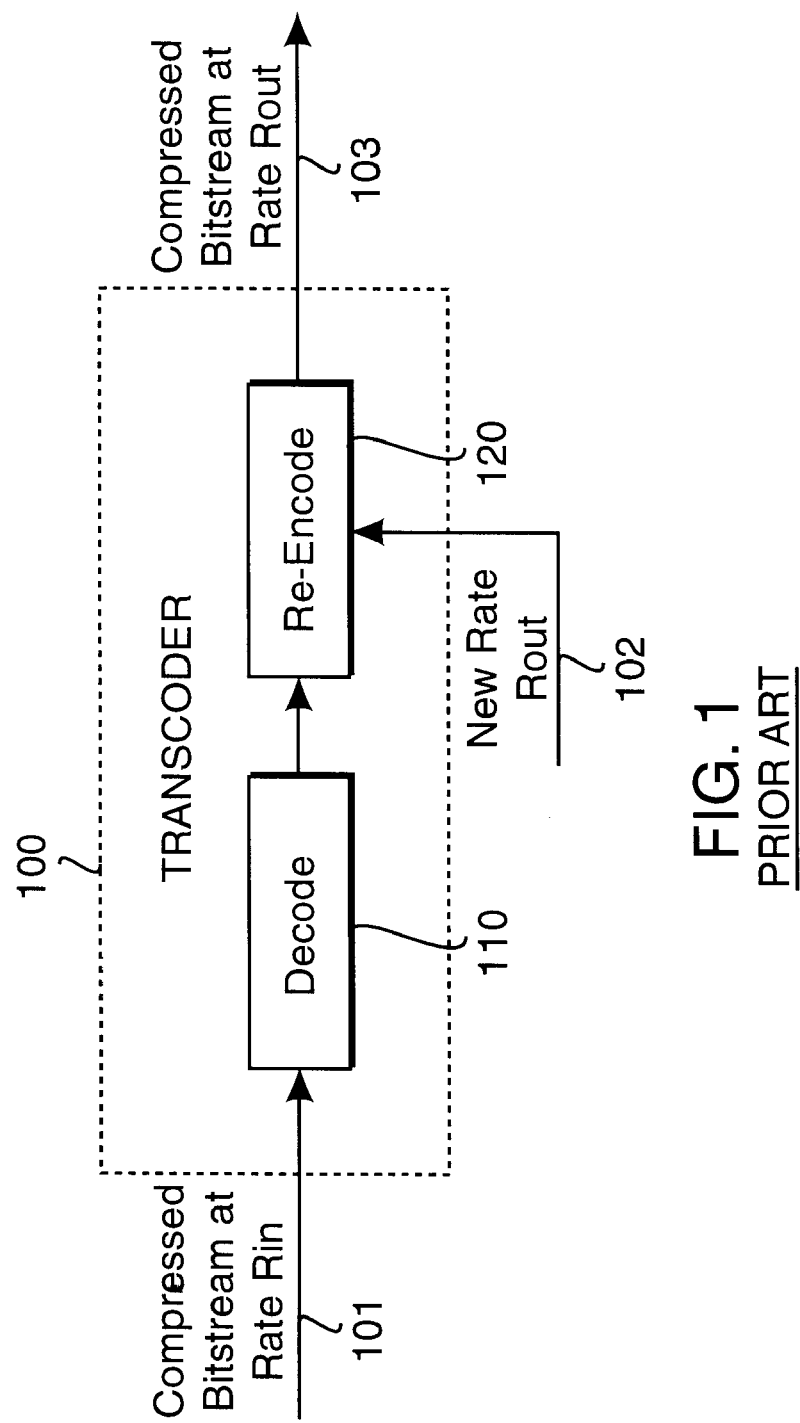
FIG. 1 is a block diagram of a prior art transcoder.
Figure 2:
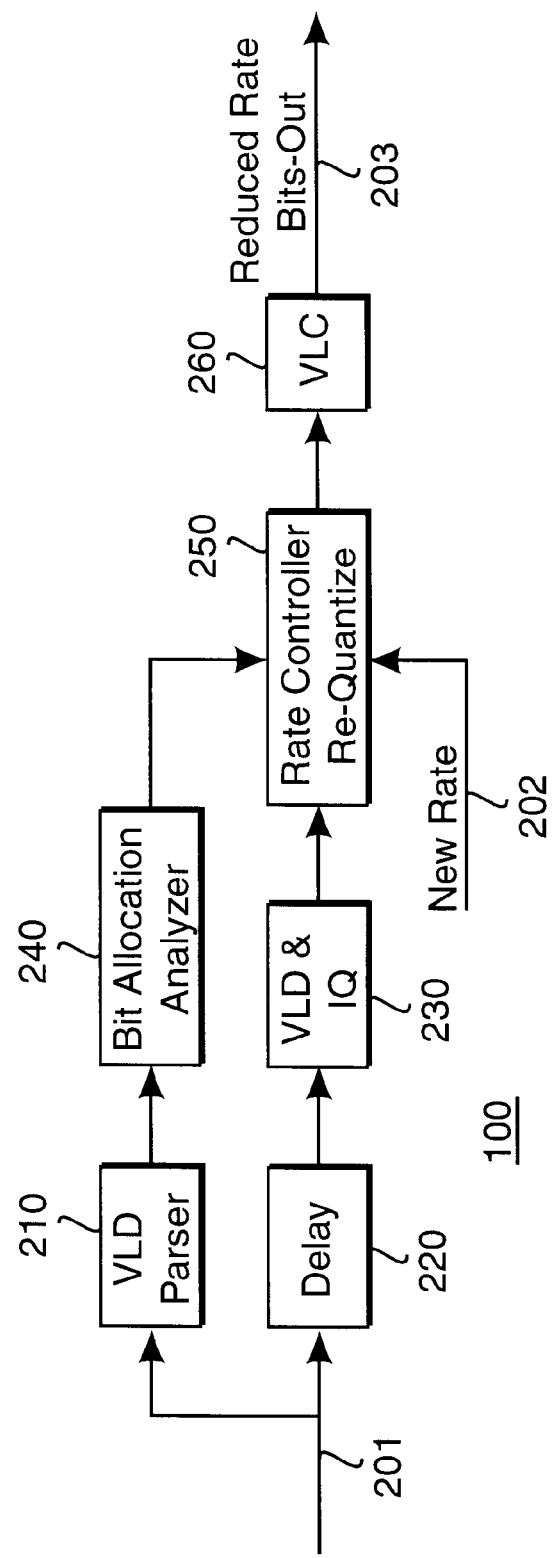
FIG. 2 is a block diagram of a prior art partial decoder/encoder.
Figure 3:
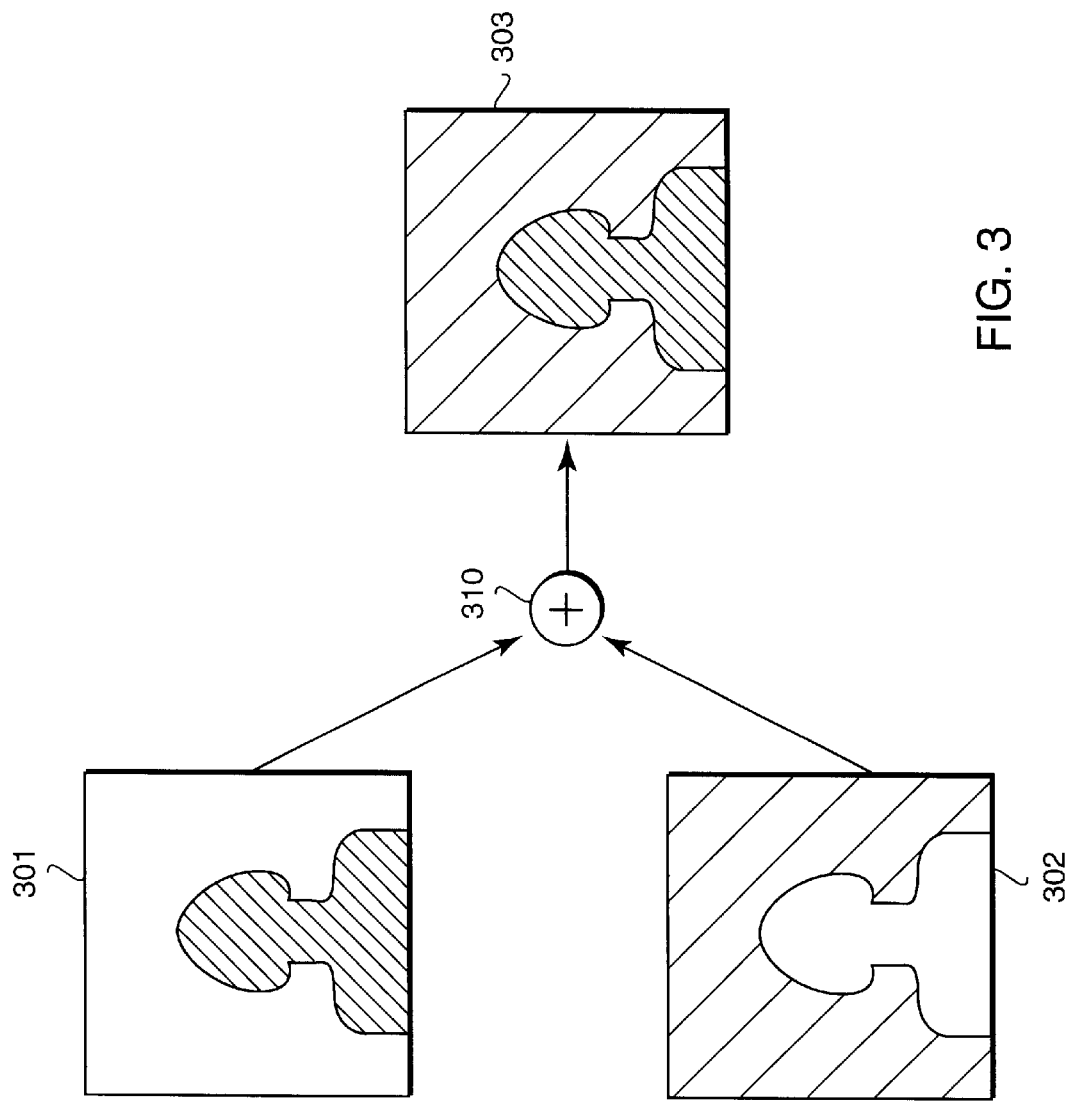
FIG. 3 is a block diagram of a scene reconstructed from two video objects.

FIG. 3 shows a scene 303 that has been partitioned into two video objects; a foreground object 301 and a background object 302. The scene can be reconstructed by combining the two objects. In this simple example, the foreground object is a moving person and the background object is a stationary wall. Note, that in the initial frame the pixels of the foreground and background objects define all of the pixels in the scene. When these two objects are encoded at the same temporal resolution, there is no problem with object composition during image reconstruction in the receiver. All pixels in the reconstructed scene 303 are defined.

However, a problem occurs when the objects are encoded at different temporal resolutions. As an example, the background is encoded at a frame rate of 15 Hz, while the foreground is encoded at a frame rate of 30 Hz, which is twice the first rate. In general, the two objects have independent motion, and the pixels that are associated with each will change in every frame. In addition, it should be noted that the foreground object could also be relatively stationary, but that it has higher internal motion than the background object. For example, the foreground is rich in texture, and it includes moving eyes, lips, and other moving facial features, while the background is a blank wall. Therefore, it is desired to encode the foreground at a higher spatial and temporal resolution than the background.

Figure 4:
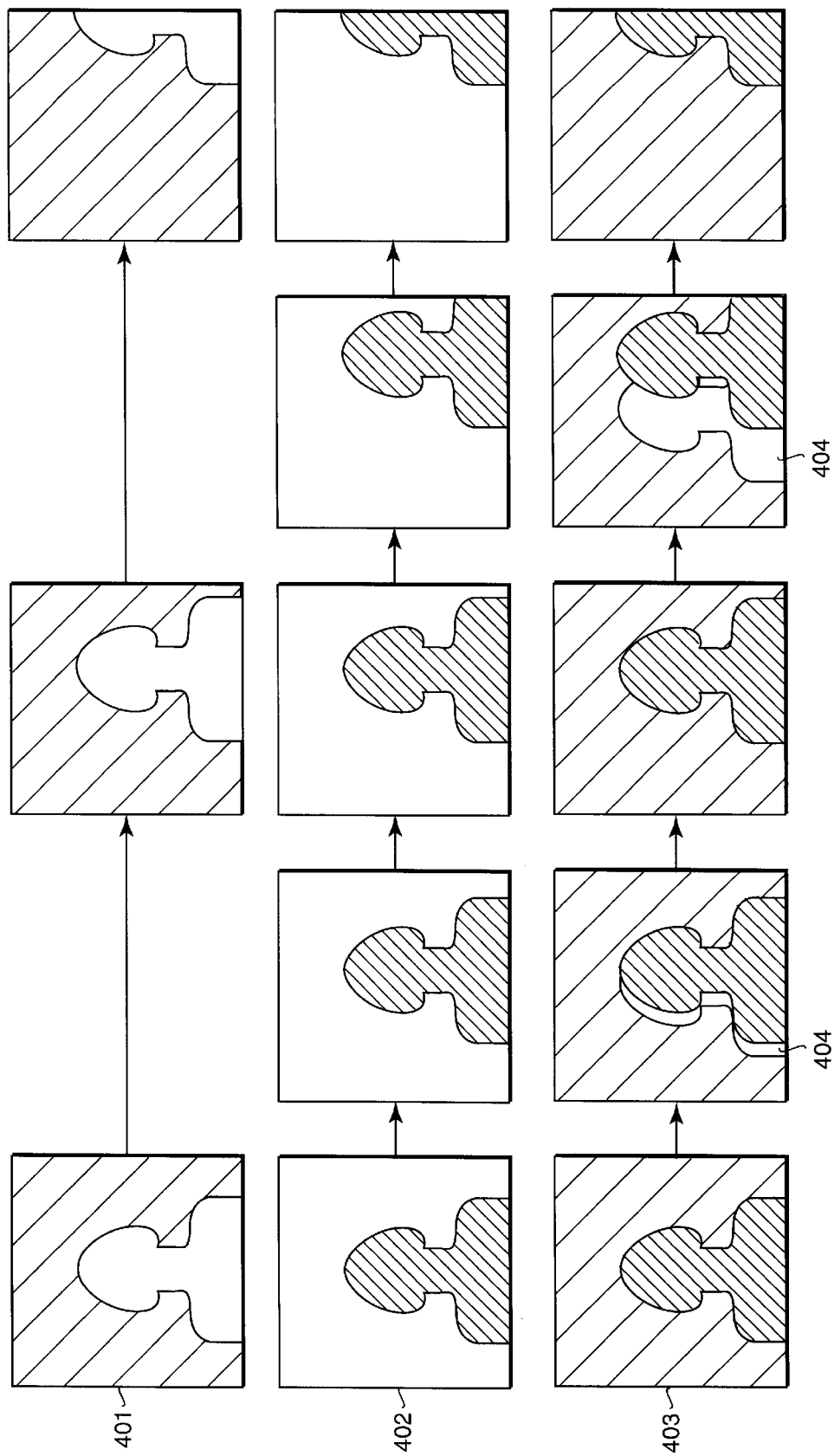
FIG. 4 is a block diagram of a scene reconstructed from two video objects having different temporal resolutions.

With our example, the foreground object is in motion with respect to the background as shown in the sequences of FIG. 4. In sequences 401–403, time runs from left to right. Here, the sequence 401 is the background object encoded at a relative low temporal resolution, the sequence 402 is the foreground objet encoded at a relative high resolution, and sequence 403 is the reconstructed scene. This causes holes 404 in every other frame. These holes are due to the movement of one object, without the updating of adjacent objects or overlapping objects. The holes are uncovered area of the scene that cannot be associated with either object and for which no pixels are defined. The holes disappear when the objects are resynchronized, e.g. every other frame.

Shape Distortion Metrics

The method and apparatus for controlling and making decisions on the temporal resolution of objects, according to our invention, indicates the amount of shape change (distortion) in a scene. We describe a number of shape features that can be extracted for this purpose, for example, one shape feature measures the shape difference of an object over time. After the shape features of the various objects have been extracted and compared, the encoder can decide the amount of temporal resolution to use for each object while encoding or transcoding.

Shape differences for each object are measured over time. The shape difference is inversely proportional to the amount of variability in the temporal resolution between the objects. For a fixed amount of time, a small difference indicate that a greater variability, whereas large difference indicates a lower variability. If the duration of time between when objects are resynchronized is made larger, the saved bits can be allocated to objects that need better quality.

Temporal Metrics

A method that optimally synchronizes the objects operates as follows. Periodically sample the video to find a difference between the shapes of each object over time. If the shape difference of an object is small over time, then increase the sampling period for measuring the difference. Continue to increase the sampling period until the difference is greater than some predetermined threshold D. At this point, either output the frames to resynchronize the video objects with that difference, or determine new frequency at which the objects should be synchronized. The frequency can be based on an average, a minimum, or a median time interval between synchronization frames. This frequency can be the used to determine an optimal temporal rate for each of the various video objects.

Difference Based Shape Features

For simplicity, we consider the difference in shape features between two scenes only, i.e., from one frame to the next. However, such shape features can also relate to the scene at various cue levels. Cue levels are defined in U.S. patent application Ser. No. 09/546,717, "Adaptable Bitstream Video Delivery System" filed by Vetro et al. on Apr. 11, 2000, incorporated herein by reference.

Depending on the cue level from which the shape feature is extracted, a temporal controller can provide various ways to effect the temporal resolution of objects in the scene, which are applicable to both encoders and transcoders.

Hamming Distance

The first difference measure that we consider is the well-known Hamming distance. The Hamming distance measures the number of pixels that are different between two shapes. First, we only consider binary shapes, i.e., segmentation (alpha—$\alpha$) values may only be zero or one, where zero refers to a transparent pixel in an segmentation plane and one refers to an opaque pixel in the segmentation plane. Within this context, the Hamming distance, d, is defined as:

$$d = \sum_{n=0}^{N-1} \sum_{m=0}^{M-1} |\alpha_1(m,n) - \alpha_2(m,n)|$$

where $\alpha_1$ (m,n) and $\alpha_2$(m, n) are corresponding segmentation planes at different time instances.

Hausdorff Distance

Another widely used shape difference measure is the Hausdorff distance, which is defined as the maxmin function between two sets of pixel:

$$h(A,B) = \max\{\min\{d(a,b)\}\}$$

where a and b are pixels of the sets A and B of two video objects respectively, and d(a,b) is the Euclidean distance between these pixels. The above metric indicates the maximum distance of the pixels in set A to the nearest pixel in set B. Because this metric is not symmetric, i.e., h(A,B) may not be equal to h(B,A), a more general definition is given by:

$$H(A,B) = \max\{h(A,B), h(B,A)\}.$$

We should note that these difference measures are most accurate when computed in the pixel-domain, however approximated data from the compressed-domain can also be used in the above computations. The pixel-domain data are readily available in the encoder, but for the transcoder, it may not be computationally feasible to decode the shape data. Instead, the data can be approximated in some computationally efficient way.

Macroblock Based Shape Features

For instance, in MPEG-4, shape is coded in a variety of different modes and is done at the macroblock level. For example, in intra-mode, a shape macro-block is coded as an opaque macroblock, a transparent macroblock or a boundary macroblock. The boundary blocks, of course define the shape of an object. These coding modes can be used to reconstruct the macroblock level silhouette of the binary shape. Of course, it would not be as accurate as the pixel-level metric, but is quite feasible in terms of complexity.

Encoder Structure

Figure 5:
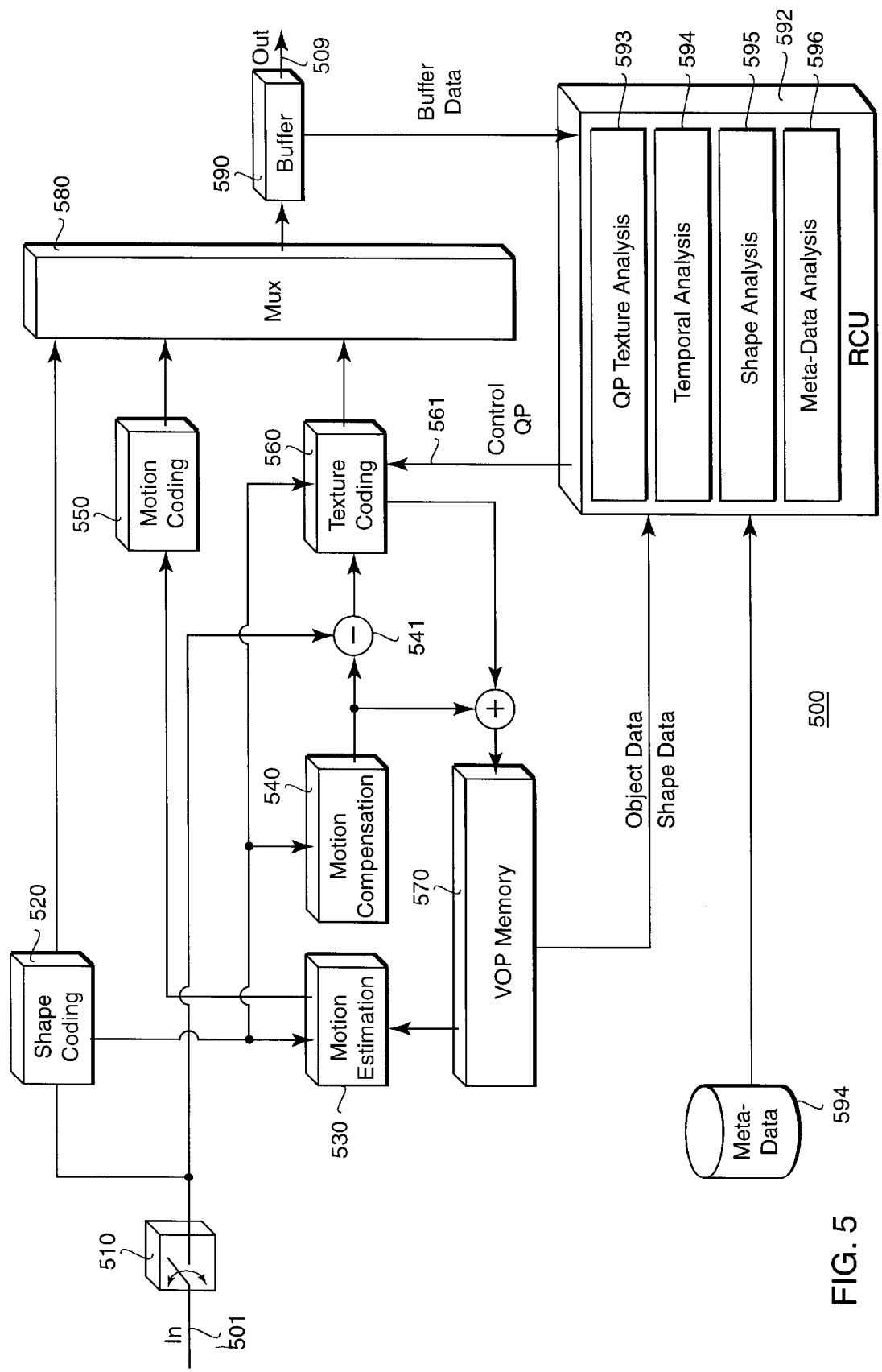
FIG. 5 is a block diagram of an encoder according to the invention.

FIG. 5 shows an object-based encoder 500 according to our invention. The encoder includes a switch 510, a shape coder 520, a motion estimator 530, a motion compensator, a motion coder 550, a texture coder 560, a VOP memory 570, a multiplexer (MUX) 580, an output buffer 590, a meta data storage unit 591. The encoder also includes a rate control unit (RCU) 592 for performing texture, temporal, shape, and meta-data analysis 593–596. Input to the encoder 500 is an object-based video (In) 501. The video is composed of a image sequence data and segmentation (alpha) planes defining the boundary (shape) of each video object.

Encoder Operation

The shape coder 520 processes the shape of each object and writes the shape coding results into an output bitstream (Out) 509 via the MUX 580 and buffer 590. The shape data are also used for motion estimation 530, motion compensation 540, and texture coding 560. Particularly, the shape data is used to extract shape features for each object. The objects, and associated shape and motion features are stored in the VOP memory 570.

In the motion estimator 530, motion vectors are determined for each macroblock. The motion vectors are also coded and written into the output bitstream via the MUX and buffer. Using the motion vectors derived from the motion estimation, a motion compensated prediction is formed from video object data stored in the VOP memory 570. This prediction is subtracted 541 from the input object yielding a set of residual macroblocks. These residual macroblocks are subject to the texture coding 560 and the corresponding data are written to the output bitstream. The texture coding is according to a QP control signal provided by the RCU.

The quantization parameter (QP) of the RCU 592 is responsible for selecting the appropriate QP for each video object. It does so by using models to estimate the corresponding QP according to the assigned rate budget. The temporal analysis is described in detail below. Briefly, the temporal analysis is responsible for controlling the temporal resolution of each object during coding and transcoding.

In the prior art, the temporal resolution of all video objects is identical to avoid composition problems as described above with reference to FIG. 4. Therefore, the prior art did not independently consider temporal resolution for the various objects. There, the temporal analysis provided a signal to skip all video objects when the output buffer was in danger of overflowing. Our invention provides a better solution, for example, objects that are relatively stationary can be encoded at a lower frame rate than faster moving objects to reduce the overall bit rate.

In the present invention, we consider variable temporal qualities. We enable the encoding and transcoding of video objects with variable temporal resolutions.

The shape analysis 592 is responsible for extracting the shape features that are used by the temporal analysis to decide if variable temporal resolution can be achieved without composing problems, i.e., holes are avoided even if the temporal encoding rates of the various objects are different. The shape analysis can work in the real-time encoding mode, where data are retrieved from the VOP memory 570. However, if the encoder also receives the meta-data 594 related to the shape features, i.e., descriptions of the content already exist, then such meta-data can be used in place of, or in conjunction with the shape data from the VOP memory 570. The meta-data are handled by the meta-data analysis, and like the shape analysis, the meta-data assists the temporal analysis in determining an optimal temporal resolution for each video object.

Transcoder Structure

Figure 6:
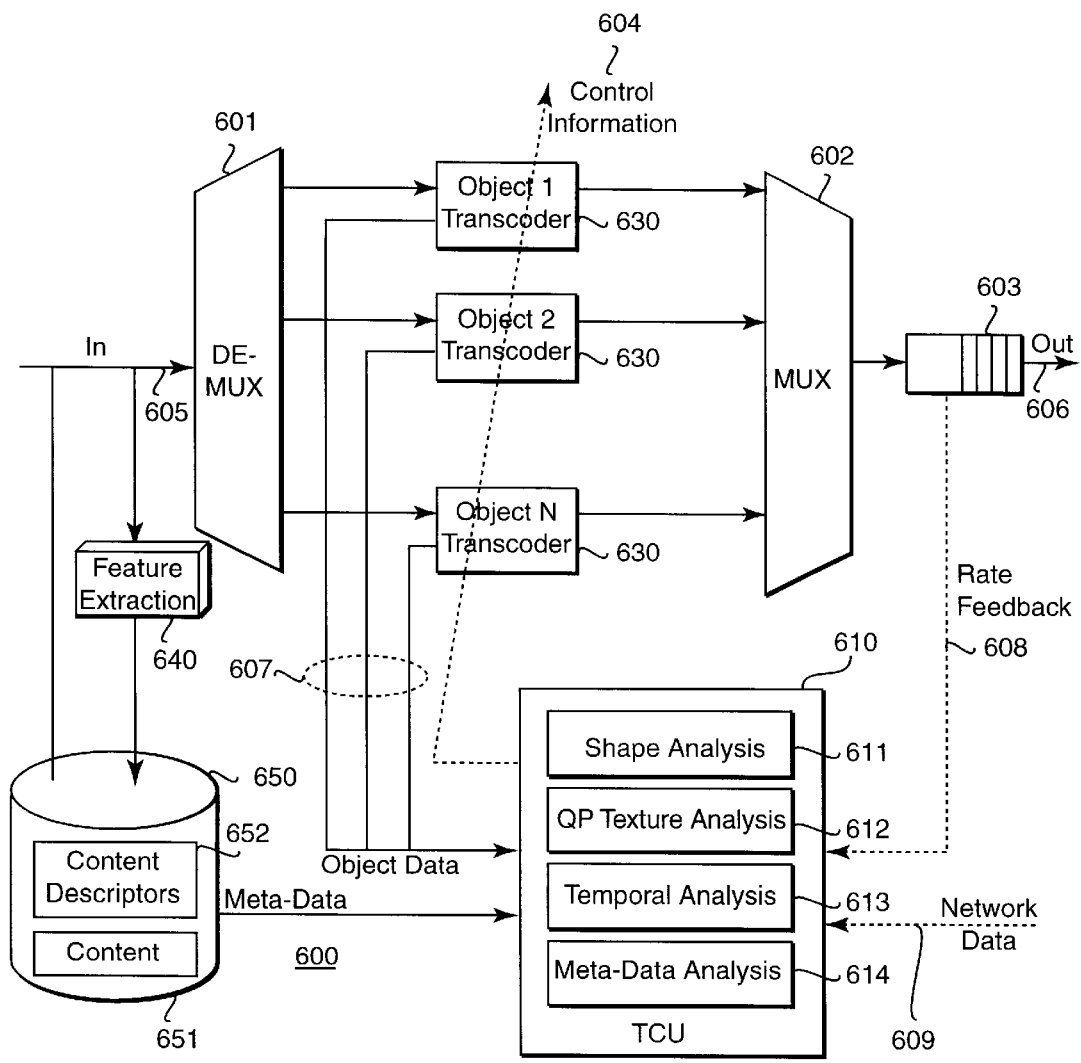
FIG. 6 is a block diagram of a transcoder according to the invention.

FIG. 6 shows a high-level block diagram of an object-based transcoder 600 according to an alternative embodiment of the invention. Here, the input video is already compressed. The transcoder 600 includes a demultiplexer 601, a multiplexer 602, and an output buffer 603. The transcoder 600 also includes one or more object-based transcoders 630 operated by a transcoding control unit (TCU) 610 according to control information 604. The unit TCU includes texture, temporal, shape and meta-data analyzers 611–514.

An input compressed bitstream 605 is partitioned into one or more an object-based elementary bitstreams by the demultiplexer. The object-based bitstreams can be serial or parallel. The total bit rate of the bitstream 605 is $R_{in}$. The output compressed bitstream 606 from the transcoder 600 has a total bit rate $R_{out}$ such that $R_{out}<R_{in}$. The multiplexer 601 provides one or more elementary bitstream to each of the object-based transcoders 630, and the object-based transcoders provide object data 607 to the TCU 610.

The transcoders scale the elementary bitstreams. The scaled bitstreams are composed by the multiplexer 602 before being passed on to the output buffer 603, and from there to a receiver. The output buffer 606 also provides rate-feedback information 608 to the TCU.

As stated above, the control information 604 that is passed to each of the transcoders is provided by the TCU. As indicated in FIG. 6, the TCU is responsible for the analysis 611–612 of texture and shape data. During the analysis, the TCU can also use network data 609. The TCU also performs meta-data analysis 614. The analysis of the temporal quality enables transcoding with variable temporal resolution.

Encoding/Transcoding Method

Figure 7:
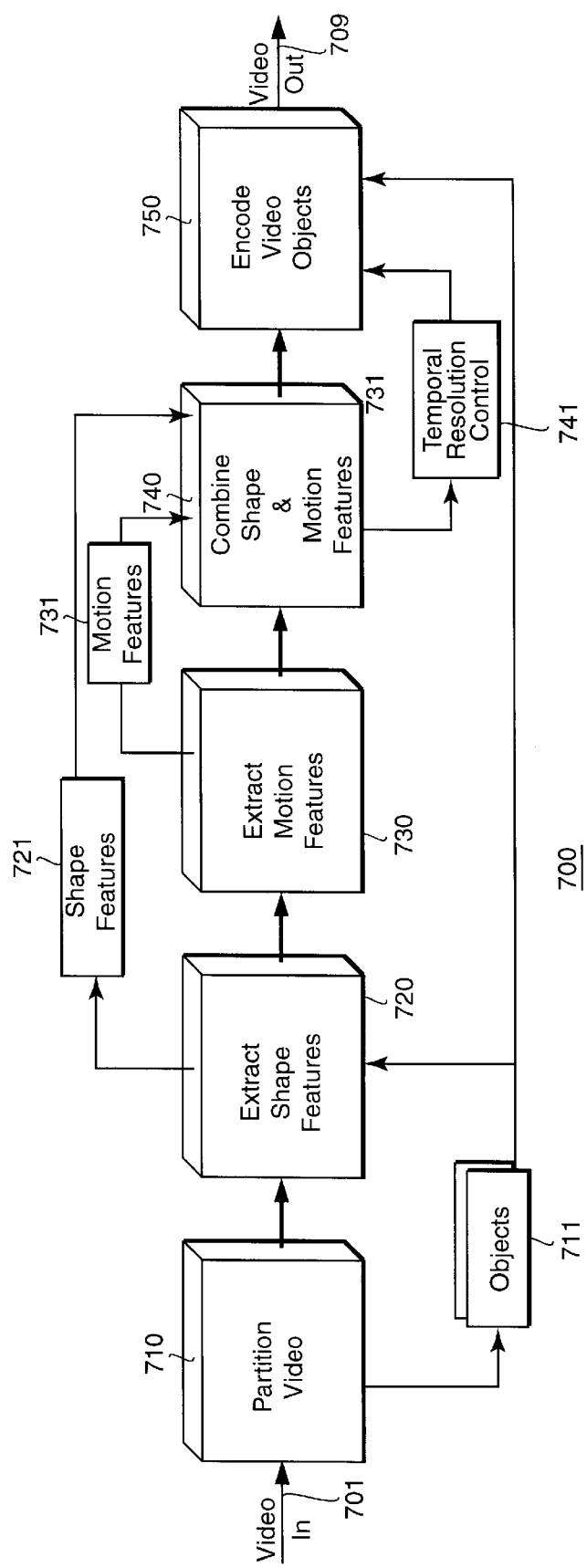
FIG. 7 is a flow diagram of a method for encoding according to the invention.

FIG. 7 shows the steps of a method 700 for encoding and transcoding a video 701 according to our invention. The input 701 to the method is either an uncompressed video in the case of the encoder 500 or a compressed video in the case of the transcoder 600. Step 710 partitions the video 701 into objects 711. Step 720 extracts, over time, shape features 721 from each object. The shape features can be distance or macroblock based as described above. Step 730 extracts, optionally, motion feature from each object over time. Other features that can be extracted and considered to determine an optimal temporal resolution can include coding complexity, e.g. spatial complexity, DCT complexity, texture complexity, etc. Step 740 combines the extracted features to determine temporal resolutions 741 to use while encoding or transcoding the various objects 711 in step 750.

Example Encoding Scenarios

Figure 8:
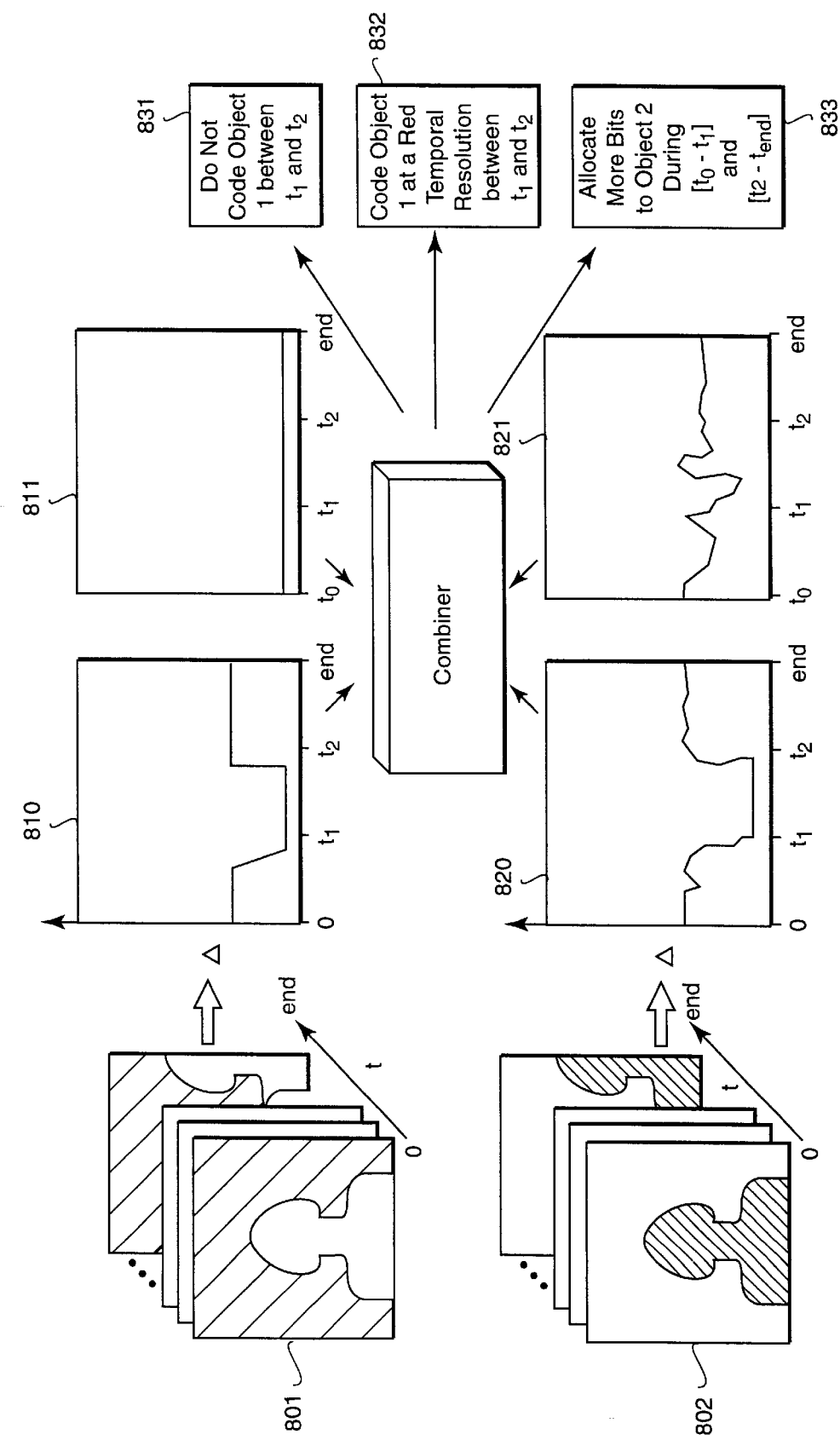
FIG. 8 is a flow diagram of an example encoding strategy used by the method of FIG. 7.

FIG. 8 show some example encoding scenarios that are based on analyzing the evolving shape of video objects over time. Here, the input is first and second extracted object sequences 801–802. Graphs 810 and 820 plot shape features, e.g. shape differences (Δ) over time (t). Note, between times $t_1$ and $t_2$ the objects' shapes remain relatively constant. Graphs 811 and 821 plot optionally each object's internal motion features over time. Note, the first object has very little internal motion, while the second object's internal motion is quite high. The combiner 850 (RCU 592 or TCU 610) considers the extracted features using, perhaps a maxmin, summation, comparison, or other function combinatorial function to make decision on how to best distribute the available bits over the various objects during the actual coding.

In scenario 831, do not code the first object at all during the interval $[t_1, t_2]$, and allocate all available bits to the second object. This might have the effect of an observable and sudden drastic change in the quality of the video at times $t_1$ and $t_2$. A better scenario 831 might use a lower temporal resolution during the interval $[t1, t_2]$, or better yet a gradual reduction in resolution followed by a gradual increase. In scenario 833, more bits are allocated to the second object during the time intervals $[t_0, t_1]$ and $[t_2, t_{end}]$, then during the interval $[t1, t_2]$, to reflect the higher internal motion of the second object.

All of the new degrees of freedom, described above, make the object-based transcoding framework very unique and desirable for network applications. As with the MPEG-2 and H.263 coding standards, MPEG-4 exploits the spatio-temporal redundancy of video using motion compensation and DCT. As a result, the core of our object-based transcoders is an adaptation of MPEG-2 transcoders that have been described above. The major difference is that shape information is now contained within the bitstream, and with regard to texture coding, tools are provided to predict DC and AC for Intra blocks.

It is also important to note that the transcoding of texture is indeed dependent on the shape data. In other words, the shape data cannot simply be parsed out and ignored; the syntax of a compliant bitstream depends on the decoded shape data.

Obviously, our object-based input and output bitstreams 601–602 are entirely different than traditional frame-based video programs. Also, MPEG-2 does not permit dynamic frame skipping. There, the GOP structure and reference frames are usually fixed.

In the non-real-time scenario case, content 651 and corresponding content descriptions 652 are stored in a database 650. The content descriptions are generated from a feature extractor 640, which accepts the input object-based bitstreams 605. When it is time to transmit the contents, the input bitstream is fed into the demux 601 and transcoder as described above. The meta-data are sent to the meta-data analysis 614 within the TCU.

Functionality of Temporal Analysis

The main objective of the temporal controller in an object-based encoder or transcoder is to maximize the quality of the composed scene on the receiver side, while avoiding composition problems as described above with reference to FIG. 4. To maximize quality under these constraints, it is necessary to exploit the temporal redundancy in the signal as much as possible.

In most video coding schemes, the motion compensation process achieves the removal of temporal redundancy. However, specifying the motion vector for every coding unit or macroblock may be more than is actually required. In addition to bits for the motion vector, the residual of the motion compensated difference must also be coded. The point is, to maximize quality not every object needs to be coded at every time instant. In this way, these saved bits can be used for other more important objects at different time instants.

For the non-real-time scenario, the temporal controller makes use of the shape distortion metrics to indicate the amount of movement among shapes in the scene. This measure can relate to the scene at various cue levels as defined in U.S. patent application Ser. No. 09/546,717. Depending on the cue level that this feature (or measure) is extracted from, the temporal controller can provide various ways to impact the temporal resolution of objects in the scene, which are applicable to both encoders and transcoders.

For real-time scenarios, the temporal controller acts in the same manner. However, because the observations are limited because of latency constraints, only causal data are considered. Therefore, the temporal coding decisions are made instantaneously.

As stated earlier, extraction of the shape distortion metric can be done in either the pixel or compressed domain. Regardless of where distortion information is extracted, it should be noted that some tolerance can be incorporated into the decision-making process of the temporal control. In other words, some applications may to tolerate a small amount of undefined area, provide that the gain in the defined area is substantial.

In this case, a weight ranging between [0,1] is defined, where 0 means that there is no movement among the shape boundaries and 1 means that the shape boundary is completely different. The weight is a function of the shape distortion metrics defined earlier and can correspond to a percentage or normalized value. On the other hand, for applications that do not allow room for composition problems, this weighting will not exist. Rather, only the extreme weights are valid, i.e., 0 or 1.

In situations when some tolerable amount of undefined pixels are received, it is possible to recover these pixels using simple post-processing interpolation techniques or other techniques based on error concealment.

Effects and Advantages of Variable Temporal Resolution Encoding

The temporal controller according to our invention provides the following effects and advantages.

Determine instances in time when objects can be encoded or transcoded with variable temporal resolution. Assign fixed non-uniform frame-rates to the objects of a video segment. Extract or locate key frames to enable the summarization of content.

Improve bit allocation, or reserve bits for portions (frames) of a video where changes in shape of objects are large. Such frames are more demanding on the bits required for the shape information. In order to maintain the quality of the texture information, additional bits may be required.

Although the invention has been described by way of examples of above embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for coding a video, comprising:
   partitioning the video into a plurality of objects;
   measuring, over time, differences in shape of each object to determine a plurality of shape features of each object;
   combining, the plurality of shape features to determine a temporal resolution for each object; and
   coding each object according to the corresponding temporal resolution of the object.

2. The method of claim 1 wherein the video is uncompressed data, and the partitioning, combining, and coding is performed in an encoder.

3. The method of claim 1 wherein the video is compressed data, and the partitioning, combining, and coding is performed in a transcoder.

4. The method of claim 1 wherein at least two objects are coded according to different corresponding temporal resolutions.

5. The method of claim 1 wherein the temporal resolution of a coded object is proportional to the shape difference associated with the coded object.

6. The method of claim 1 wherein the shape difference is a Hamming distance which measures the number of pixels that are different between the objects.

7. The method of claim 3 wherein the partitioned objects have binary shapes, and the Hamming distance, d, is defined as:

$$d = \sum_{n=0}^{N-1} \sum_{m=0}^{M-1} |\alpha_1(m,n) - \alpha_2(m,n)|$$

where $\alpha_1(m,n)$ and $\alpha_2(m,n)$ are corresponding segmentation planes at different time instants.

8. The method of claim 3 wherein the shape difference is a Hausdorff distance, which defines as maxmin function between sets of pixels, associated with the objects.

9. The method of claim 8 wherein the maxmin function is $$h(A,B) = \max\{\min\{d(a,b)\}\}$$

where a and b are pixels of sets A and B of a first and second object respectively, and d(a,b) is a Euclidean distance between the pixels.

10. The method of claim 1 wherein the video includes a plurality of frames, and each frame includes a plurality of macroblocks, and the macroblocks are coded as opaque blocks, transparent blocks, and boundary blocks.

11. The method of claim 1 further comprising:
    coding the shape features of the objects as meta-data.

12. The method of claim 1 further comprising;
    extracting, overtime, a motion feature from each object;
    combining, over time, the motion features with the shape features to determine the temporal resolution for each object over time.

13. The method of claim 1 further comprising;
    extracting, overtime, a coding complexity from each object;
    combining, over time, the coding complexity with the shape features to determine the temporal resolution for each object over time.

14. The method of claim 1 wherein the shape features of the objects are extracted from a plurality of cue levels of the video.

15. An apparatus for coding a video, comprising:
means for partitioning a video into a plurality of objects;
means for measuring, over time, differences in shape of each object to determine a plurality of shape features of each object;
means for combining, the plurality of shape features to determine a temporal resolution for each object; and
means for coding each object according to the corresponding temporal resolution of the object.

16. The apparatus of claim 15 wherein the means for partitioning and measuring includes a shape code, a motion estimator, a motion compensator and a texture coder.

17. The apparatus of claim 15 wherein the objects and shape features are stored in a memory.

18. The apparatus of claim 15 wherein the video is an uncompressed, and the means for combining is a rate control unit.

19. The apparatus of claim 15 wherein the video is compressed, and the means for combining is a transcoding control unit.

* * * * *